May 29, 1962 G. J. LEGG 3,036,545
VEHICLE MARKER
Filed Sept. 28, 1959 2 Sheets-Sheet 1

INVENTOR.
Glen J. Legg
BY
ATTORNEY

May 29, 1962  G. J. LEGG  3,036,545
VEHICLE MARKER
Filed Sept. 28, 1959  2 Sheets-Sheet 2
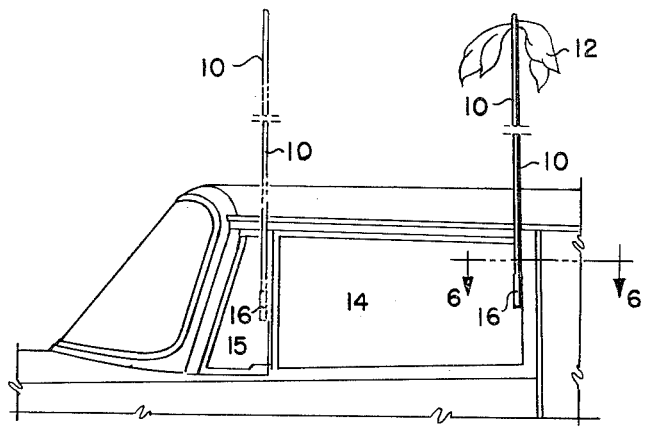
Fig. 5
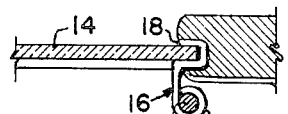
Fig. 6
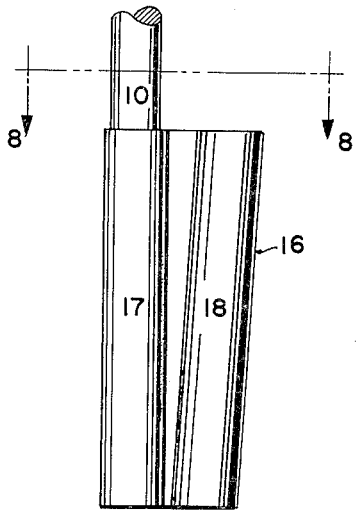
Fig. 8
Fig. 7
INVENTOR.
Glen J. Legg
BY
ATTORNEY 3,036,545
VEHICLE MARKER
Glen J. Legg, 656 Quitman St., Denver 4, Colo., assignor of one-half to Russell W. Evans, Denver, Colo.
Filed Sept. 28, 1959, Ser. No. 842,860
1 Claim. (Cl. 116—28)

This invention relates to facilities convenient of storage in anticipation of use within and expedient of optional operative association with conventional automotive vehicles to mark and signal the identity and location of a particular vehicle among many to a remote observer, and has as an object to provide a novel and improved such facility.

A further object of the invention is to provide a vehicle marker that is simple and practical of removal and replacement with respect to an associated vehicle.

A further object of the invention is to provide a novel and improved vehicle marker that is secure in unique use attachment to an associated vehicle.

A further object of the invention is to provide a novel and improved vehicle marker adapted for use association with a vehicle through the agency of unmodified, conventional vehicle components.

A further object of the invention is to provide a novel and improved vehicle marker that is optionally amenable to use association with a vehicle in various specific locations thereon.

A further object of the invention is to provide a novel and improved vehicle marker that is susceptible of production in diverse embodiments and constructions.

A further object of the invention is to provide a novel and improved vehicle marker adapted for the mounted display of a wide range of specific identifications.

A further object of the invention is to provide a novel and improved vehicle marker that is simple and economical of production from readily-available materials, that is compact in a form convenient of manipulation, use and storage, that is of substantially universal use adaptability to conventional automotive vehicles without occasion for any alteration or modification of the vehicle, that is mountable in and removable from use association with a vehicle without recourse to tools, and that is positive and efficient in attainment of the ends for which designed.

With the foregoing and other objects in view, my invention consists in the construction, arrangement, and operative combination of elements as hereinafter set forth, pointed out in my claim, and illustrated by the accompanying drawings, in which—

FIGURE 5 is a view similar to FIGURE 1 illustrating an alternative embodiment of the invention by means of solid lines in one mounted association with a vehicle and by means of broken lines in a different such use association, portions of the marker length being broken away to conserve space.

FIGURE 6 is a fragmentary, detail section, on a relatively enlarged scale, taken substantially on the indicated line 6—6 of FIGURE 5.

FIGURE 7 is a fragmentary, detail elevation, on a further enlarged scale, of the lower, or attachment, end of the marker represented in FIGURES 5 and 6.

FIGURE 8 is a fragmentary, detail section taken substantially on the indicated line 8—8 of FIGURE 7.

Figure 1:
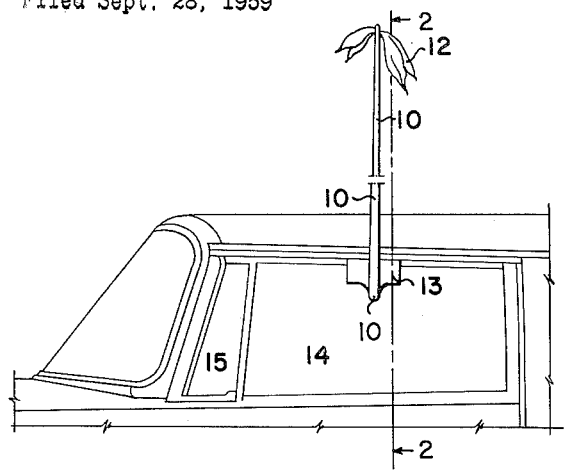
FIGURE 1 is a fragmentary, side elevational view of the left-side, forward portion of a conventional automotive vehicle passenger compartment equipped with a typical embodiment of my device in use position thereon, a portion of the marker length being broken away to conserve space.

The massing of automobiles in parking areas of considerable capacity, as at beaches, athletic contests, adjacent urban centers, and the like, has seriously aggravated the problem of identifying and locating a given vehicle in the absence of attendant control of the area through some form of checking system, whence arises recognition of the merit of an identifying marker susceptible of optional attachment to a vehicle for view by a remote observer, and the instant invention is hence directed to the provision of an eminently practical such marker that is simple and convenient of efficient use in association with substantially all conventional automotive vehicles for the effective display of any of a wide range of specific identifications.

As typified by FIGURES 1—4, inclusive, the improvement in a form adapted for mounted coaction with upper edge margins of conventional, vertically-adjustable, automobile windows comprises a stiff, straight, desirably-tapered wand or staff 10 of considerable length and any suitable material longitudinally clef to provide a slot 11 at its reduced free end for the reception and frictional retention of any desired identification, such as a flag 12, and integrally engaged at its other, greater end with a U-shaped climp 13 adapted to slidably embrace the upper margin of a conventional, vertically-adjustable automobile window 14 when the latter is lowered sufficiently to receive the clip. The upper margin of the window 14 being normally inset slightly relative to overhanging elements of the vehicle structure past and beyond which the wand 10 is designed to upstand, engagement of the wand with the clip 13 is had by means of a laterally-offset portion, extension, or arm 10' at the greater end of the element 10 which connects in a perpendicular relationship to and centrally of one side of the clip 13 to dispose the latter transverse to and offset laterally from the adjacent end of the wand with the groove of said clip directed to open at its long side away from the cleft free end of the wand.

Figure 2:
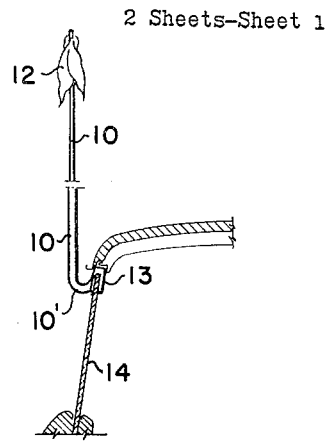
FIGURE 2 is a transverse section through the arrangement according to FIGURE 1 taken substantially on the indicated line 2—2 thereof, inconsequential details of the conventional vehicle construction being omitted.
Figure 3:
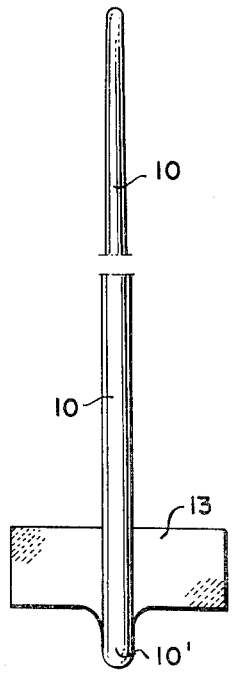
FIGURE 3 is a front elevational view, on an enlarged scale, of the marker unit represented in FIGURE 1 separate from association with a vehicle, a portion of the marker length being broken away to conserve space.
Figure 4:
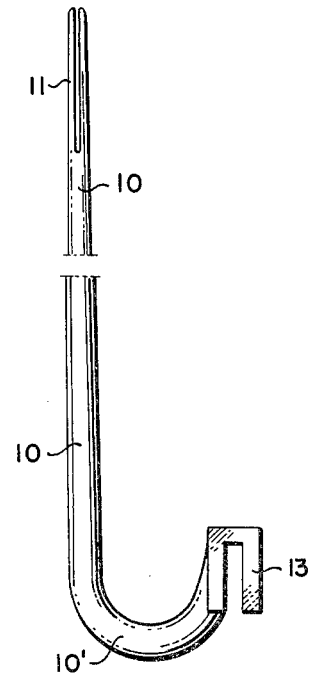
FIGURE 4 is a side view of the marker as shown in FIGURE 3.

Use of the marker embodiment just described as represented by FIGURES 1 and 2 should be adequately apparent, it being obvious that a slight lowering of any automobile window 14 permits engagement of the clip 13 over and upon the exposed window upper margin to dispose the wand 10, carrying its flag 12, in extension exteriorly of and above the vehicle, whereafter closing of the so-equipped window to the extent permitted by the clip 13 clamps the latter between the window margin and the structural seat complementary thereto for secure retention of the marker as mounted in position of use. Lowering of the window releases the marker for removal in a reversal of the above operations, and when removed the marker is expedient of storage in the vehicle.

Functionally the equivalent of the construction just described and correspondingly adapted for mounted use association with margins of conventional automobile windows, the embodiment of the improvement according to FIGURES 5-8, inclusive, utilizes the wand 10 with its slot 11 and flag 12, in any desired particularity of construction, as above set forth, and differs only in the provision of an attaching clip in fixed association with the greater, or lower, end of the wand 10 adapted to coact with side, rather than upper margins of the conventional window 14 and also, when preferred, with the trailing side margin of conventional, horizontally-adjustable, vent windows 15 extensively characterizing passenger automobiles. Indicated at 16, the mounting clip of the arrangement according to FIGURES 5-8 is a preferably unitary member of suitable formable material, such as metal or plastic, presenting a tubular socket 17 adapted for press-fit accommodation and retention of the greater, or lower, end of the wand 10 in spaced juxtaposition with one side of a U-shaped channel 18 longitudinally slightly convergent therewith toward the socket-seated end of the wand. Formed from thin material to a groove opening engageable over the marginal thickness of a conventional window 14 or 15, the channel portion 18 of the clip 16 may be pressed within an exposed portion of the side slideway for the window 14 when the latter is lowered and therein securely clamped to maintain the wand 10 in its use position when the window is raised to traverse and fill the so disposed channel, the upwardly-divergent relation of the socket 17 and channel 18 operating to clear the mounted wand relative to overhanging elements of the vehicle structure. Somewhat similarly, and with equal security, the wand may be mounted upon the trailing margin of the vent window 15 through engagement of the channel 18 thereover when said window has been horizontally adjusted to a slight opening, whereafter closing of the vent window clamps said channel 18 against fixed elements of the vehicle structure in an obvious and effective manner.

Since changes, variataion, and modifications in the form, construction, and arrangement of the elements shown and described may be had without departing from the spirit of my invention, I wish to be understood as being limited solely by the scope of the appended claim, rather than by any details of the illustrative showing and foregoing description.

I claim as my invention—

In a vehicle marker having a wand adapted to display identification means in elevated relation with and exteriorly of conventional vehicle enclosures characterized by glass window panels marginally engaged and vertically adjustable in fixed slideways, a mounting clip adapted for attachment to the lower end of such wand selectively and separably coactable with a window panel margin and its associated slideway to support said wand in use position on the enclosure including the panel, said clip comprising a longitudinally-elongated, laterally-narrow unit of substantially rigid thin sheet mtaerial bounded by spacedly-parallel end margins of unequal length and slightly-convergent long sides closing between said end margins, said unit being formed with a straight, transversely U-shaped channel at one of its long sides adapted to embrace and slidably accommodate the window panel margin in an exterior conformation receivable with a press fit in and for frictional retention by the panel margin slideway, a socket coaxially coactable with and to support the lower end of said wand at the other long side of the unit in consequent slight convergence with said channel, and an integral web conjoining said channel and socket with the latter substantially tangent to the plane intersected by the channel groove opening and on the same side of said plane as the channel.

References Cited in the file of this patent
UNITED STATES PATENTS

| | | |
|---|---|---|
| 263,272 | Whyte | Aug. 22, 1882 |
| 1,846,794 | Dandridge | Feb. 23, 1932 |
| 1,861,366 | Sherwood | May 31, 1932 |
| 2,290,645 | Lange | July 21, 1942 |
| 2,445,606 | Davis | July 20, 1948 |
| 2,534,117 | Flick | Dec. 12, 1950 |
| 2,782,745 | Paschke | Feb. 26, 1957 |